(12) United States Patent
Kim

(10) Patent No.: US 12,423,513 B2
(45) Date of Patent: Sep. 23, 2025

(54) METHOD FOR GENERATING PROTOTYPE USING SCREEN IMAGES AND SYSTEM IMPLEMENTING THE SAME

(71) Applicant: STUDIO XID KOREA, INC., Seoul (KR)

(72) Inventor: Soo Kim, Wanju-gun (KR)

(73) Assignee: STUDIO XID KOREA, INC., Seoul (KR)

( * ) Notice: Subject to any disclaimer, the term of this patent is extended or adjusted under 35 U.S.C. 154(b) by 0 days.

(21) Appl. No.: 18/656,815

(22) Filed: May 7, 2024

(65) Prior Publication Data
US 2025/0232112 A1    Jul. 17, 2025

(30) Foreign Application Priority Data

Jan. 15, 2024    (KR) .................. 10-2024-0006128
Mar. 8, 2024    (KR) .................. 10-2024-0032930

(51) Int. Cl.
*G06F 17/00*    (2019.01)
*G06F 3/0481*    (2022.01)
(Continued)

(52) U.S. Cl.
CPC .......... *G06F 40/186* (2020.01); *G06F 3/0481* (2013.01); *G06V 10/764* (2022.01); *G06V 20/62* (2022.01); *G06V 2201/10* (2022.01)

(58) Field of Classification Search
CPC ..... G06F 40/186; G06F 3/0481; G06V 20/62; G06V 10/764
See application file for complete search history.

(56) References Cited

U.S. PATENT DOCUMENTS 10,032,072 B1 *    7/2018    Tran .................. G06F 18/28
10,783,405 B2 *    9/2020    Rohde ................ G06F 8/38
(Continued)

FOREIGN PATENT DOCUMENTS

KR    100823227 B1    4/2008
KR    10-2343477 B1    12/2021
(Continued)

OTHER PUBLICATIONS

Savic et al, Win GUI Crawler: A tool prototype for desktop GUI image and metadata collection, 2022 IEEE International Conference on Software Testing, Verification and Validation Workshops pp. 223-228 (Year: 2022).*

(Continued)

*Primary Examiner* — Mohammed H Zuberi
(74) *Attorney, Agent, or Firm* — Studebaker Brackett PLLC

(57) ABSTRACT

The present disclosure according to at least one embodiment provides a method for generating a prototype by using a screen image, performed by a computing system. The method comprises acquiring screen image data including meta data for each of a plurality of objects included in the screen image, identifying a template interaction corresponding to the screen image among a plurality of predefined template interactions based on a result of analyzing at least one of a correspondence relationship between the plurality of objects or the meta data of each of the plurality of objects, and automatically generating a prototype corresponding to the screen image by using the identified template interaction and the screen image.

18 Claims, 15 Drawing Sheets

(51) Int. Cl.
  *G06F 40/186*   (2020.01)
  *G06V 10/764*   (2022.01)
  *G06V 20/62*    (2022.01)

(56) References Cited

U.S. PATENT DOCUMENTS

| | | | |
|---|---|---|---|
| 10,877,735 B1* | 12/2020 | Buck | G06F 8/10 |
| 11,960,864 B2* | 4/2024 | Kaliyaperumal | G06V 30/413 |
| 2012/0224765 A1* | 9/2012 | Kim | G06V 10/774 |
| | | | 382/176 |
| 2013/0285948 A1* | 10/2013 | Zhang | G06F 3/0486 |
| | | | 345/173 |
| 2016/0261675 A1* | 9/2016 | Block | G06F 3/04842 |
| 2018/0203674 A1* | 7/2018 | Dayanandan | G06F 8/35 |
| 2019/0250891 A1* | 8/2019 | Kumar | G06T 7/70 |
| 2021/0406577 A1* | 12/2021 | Ahn | G06N 3/08 |
| 2023/0095089 A1* | 3/2023 | Kaliyaperumal | G06V 10/235 |
| | | | 715/762 |
| 2023/0334227 A1* | 10/2023 | East | G06F 9/4498 |
| 2023/0360291 A1 | 11/2023 | Budorick et al. | |
| 2024/0012548 A1 | 1/2024 | Chui et al. | |

FOREIGN PATENT DOCUMENTS

| | | |
|---|---|---|
| KR | 10-2022-0018891 A | 2/2022 |
| KR | 102497475 B1 | 2/2023 |
| KR | 10-2023-0161072 A | 11/2023 |

OTHER PUBLICATIONS

An Office Action mailed by the Korean Intellectual Property Office on Jun. 7, 2024, which corresponds to Korean Patent Application No. 10-2024-0032930 and is related to U.S. Appl. No. 18/656,815.

* cited by examiner

METHOD FOR GENERATING PROTOTYPE USING SCREEN IMAGES AND SYSTEM IMPLEMENTING THE SAME

CROSS-REFERENCE TO RELATED APPLICATION

This application claims priority from Korean Patent Application No. 10-2024-0006128 filed on Jan. 15, 2024 and Korean Patent Application No. 10-2024-0032930 filed on Mar. 8, 2024 in the Korean Intellectual Property Office and all the benefits accruing therefrom under 35 U.S.C. 119, the contents of which in its entirety are herein incorporated by reference.

BACKGROUND

Technical Field

The present disclosure relates to a method for generating a prototype using screen images and a system for implementing the same, and more particularly, to a method for generating a prototype using screen images, in which a prototype including a user interaction is automatically generated using a plurality of screen images authoring to develop a screen interface such as a mobile application, and a system for implementing the same.

Description of the Related Art

In general, in a process of designing a UI for a mobile application or the like, a screen in each situation is output. For example, a design screen for each situation may be generated using a UI design authoring tool such as Figma. A developer may describe a relationship between design screens such that a flow, which is a connection relationship between the design screens, is designated.

However, there is a lot of insufficient information for developers to develop real applications with situation-specific design screens. For example, as in the example of FIG. 1, situation-specific design screens 11, 12, 13, 14, and 15 produced by a UI design authoring tool 10 include information on a layout of a screen, an appearance of each graphic object constituting the screen or an arrangement method of each graphic object, but it is difficult to check information on feedback according to a user's screen manipulation.

Meanwhile, a prototype authoring tool for authoring a user interaction using a UI is provided separately from the UI design authoring tool. For example, ProtoPie served by the present applicant is a tool that defines unit interactions by defining triggers, objects, and responses, and thus allows interactions of entire applications or some applications to be prototyped in a cordless manner.

A designer who uses a UI design authoring tool should generate a UI prototype by utilizing the prototype authoring tool once again based on a situation-specific design screen that is the product of the UI design authoring tool and provide the generated UI prototype to a developer.

However, it takes considerable effort and time to learn how to use each of the UI design authoring tool and the prototype authoring tool in view of the designer. In addition, even for a simple work, there is an inconvenience of having to additionally use the prototype authoring tool, making it difficult for the prototype authoring tool to be widely used.

Therefore, it is required to provide a method for automatizing even at least a portion of a prototypes by using results of the UI design authoring tool.

BRIEF SUMMARY

An object of the present disclosure is to provide a method for generating a prototype using screen images, in which the prototype may be automatically generated using a plurality of screen images including a plurality of objects to provide a prototype for developing or demonstrating a screen interface such as a mobile application, and a system for implementing the same.

Another object of the present disclosure is to provide a method for generating a prototype using screen images, in which a prototype including a user interaction may be provided simultaneously with a screen design on single software without individually using a UI design authoring tool and a prototype authoring tool, and a system for implementing the same.

Other object of the present disclosure is to provide a method for generating a prototype using screen images, in which effort, time and cost, which are additionally required to produce the prototype, may be remarkably reduced in a process of designing a screen interface, and a system for implementing the same.

The objects of the present disclosure are not limited to those mentioned above and additional objects of the present disclosure, which are not mentioned herein, will be clearly understood by those skilled in the art from the following description of the present disclosure.

According to an aspect of the present disclosure, there is provided a method for generating a prototype by using a screen image, performed by a computing system. The method comprises acquiring screen image data including meta data for each of a plurality of objects included in the screen image, identifying a template interaction corresponding to the screen image among a plurality of predefined template interactions based on a result of analyzing at least one of a correspondence relationship between the plurality of objects or the meta data of each of the plurality of objects, and automatically generating a prototype corresponding to the screen image by using the identified template interaction and the screen image.

In some embodiments, the acquiring screen image data may include acquiring the meta data including information on at least one of a hierarchical structure of the plurality of objects, a type of each object, a display attribute, a screen coordinate or an input style.

In some embodiments, the identifying a template interaction corresponding to the screen image among the plurality of predefined template interactions may include inputting information on a hierarchical structure of the plurality of objects among the meta data of each of the plurality of objects to a machine-learned AI-based object determination model, and identifying the template interaction corresponding to the screen image by using a result output from the AI-based object determination model.

In some embodiments, the identifying a template interaction corresponding to the screen image among the plurality of predefined template interactions may include analyzing information on a prefix or suffix defining a type of each object among the meta data of each of the plurality of objects, and identifying the template interaction corresponding to the screen image by using the analyzed result.

In some embodiments, the identifying a template interaction corresponding to the screen image among the plurality of predefined template interactions may include identifying the plurality of objects included in the screen image and a type of each object based on an AI learning model, and identifying the template interaction corresponding to the screen image based on the identified type of each object.

In some embodiments, the identifying a plurality of objects included in the screen image and a type of each object based on an AI learning model may include identifying the plurality of objects included in the screen image by using the computer vision technology, and identifying the type of each object by using a result of recognizing an image or text included in each object.

In some embodiments, the identifying a template interaction corresponding to the screen image among the plurality of predefined template interactions may include identifying the template interaction corresponding to the screen image by using at least one of the meta data for each of the plurality of objects or information on the type of each object, which is identified based on an AI learning model.

In some embodiments, each of the plurality of predefined template interactions may include a plurality of template objects, and a trigger and a response, which are applied to each of the template objects, and is set by a user input.

In some embodiments, the method may further comprise displaying a scan image including an identification code for transmitting the automatically generated prototype to an external device on a screen of the computing system.

According to an aspect of the present disclosure, there is provided a method for generating a prototype by using a screen image, performed by a computing system. The method comprises acquiring first screen image data including a plurality of first objects included in a first screen image and meta data of each of the first objects and second screen image data including a plurality of second objects included in a second screen image displayed as a result of a user interaction for the first screen image and meta data of each of the second objects, identifying an interworking template interaction corresponding to the first screen image and the second screen image based on a result of analyzing at least one of a correspondence relationship between the plurality of first objects and the plurality of second objects or meta data of each of the plurality of first objects and the plurality of second objects, and automatically generating a prototype corresponding to the first screen image and the second screen image by using the identified interworking template interaction and the first screen image and the second screen image.

In some embodiments, the acquiring first screen image data and second screen image data may include acquiring the meta data including information on a before-and-after relationship between the first screen image and the second screen image.

In some embodiments, the identifying an interworking template interaction corresponding to the first screen image and the second screen image may include identifying whether associated information between the meta data of the plurality of first objects and the meta data of the plurality of second objects exists.

In some embodiments, when the associated information exists, the identifying an interworking template interaction corresponding to the first screen image and the second screen image may include generating the interworking template interaction including a logic for generating a variable for a first object that is one of the plurality of first objects, a logic for storing information input using the first object as a value of the variable and a logic for displaying the stored value of the variable in a second object that is one of the plurality of second objects.

According to an aspect of the present disclosure, there is provided a computing system comprising one or more processors, a memory loading a computer program performed by the processor; and a storage storing the computer program, wherein the computer program includes instructions for performing an operation of acquiring screen image data including meta data for each of a plurality of objects included in a screen image, an operation of identifying a template interaction corresponding to the screen image among a plurality of predefined template interactions based on a result of analyzing a correspondence relationship between the plurality of objects or the meta data of each of the plurality of objects, and an operation of automatically generating a prototype corresponding to the screen image by using the identified template interaction and the screen image.

In some embodiments, the operation of acquiring screen image data may include acquiring the meta data including information on at least one of a hierarchical structure of the plurality of objects, a type of each object, a display attribute, a screen coordinate or an input style.

In some embodiments, the operation of identifying a template interaction corresponding to the screen image among a plurality of predefined template interactions may include an operation of inputting information on a hierarchical structure of the plurality of objects among the meta data of each of the plurality of objects to a machine-learned AI-based object determination model, and identifying the template interaction corresponding to the screen image by using a result output from the AI-based object determination model.

In some embodiments, the operation of identifying a template interaction corresponding to the screen image among a plurality of predefined template interactions may includes an operation of analyzing information on a prefix or suffix defining a type of each object among the meta data of each of the plurality of objects, and an operation of identifying the template interaction corresponding to the screen image by using the analyzed result.

In some embodiments, the operation of identifying a template interaction corresponding to the screen image among the plurality of predefined template interactions may includes an operation of identifying the plurality of objects included in the screen image and a type of each object based on an AI learning model, and an operation of identifying the template interaction corresponding to the screen image based on the identified type of each object.

In some embodiments, the operation of identifying a plurality of objects included in the screen image and a type of each object based on an AI learning model may include an operation of identifying the plurality of objects included in the screen image by using the computer vision technology, and an operation of identifying the type of each object by using a result of recognizing an image or text included in each object.

In some embodiments, the operation of identifying a template interaction corresponding to the screen image among the plurality of predefined template interactions may include an operation of identifying the template interaction corresponding to the screen image by using at least one of the meta data for each of the plurality of objects or information on a type of each object, which is identified based on an AI learning model.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION OF THE DISCLOSURE

Figure 1:
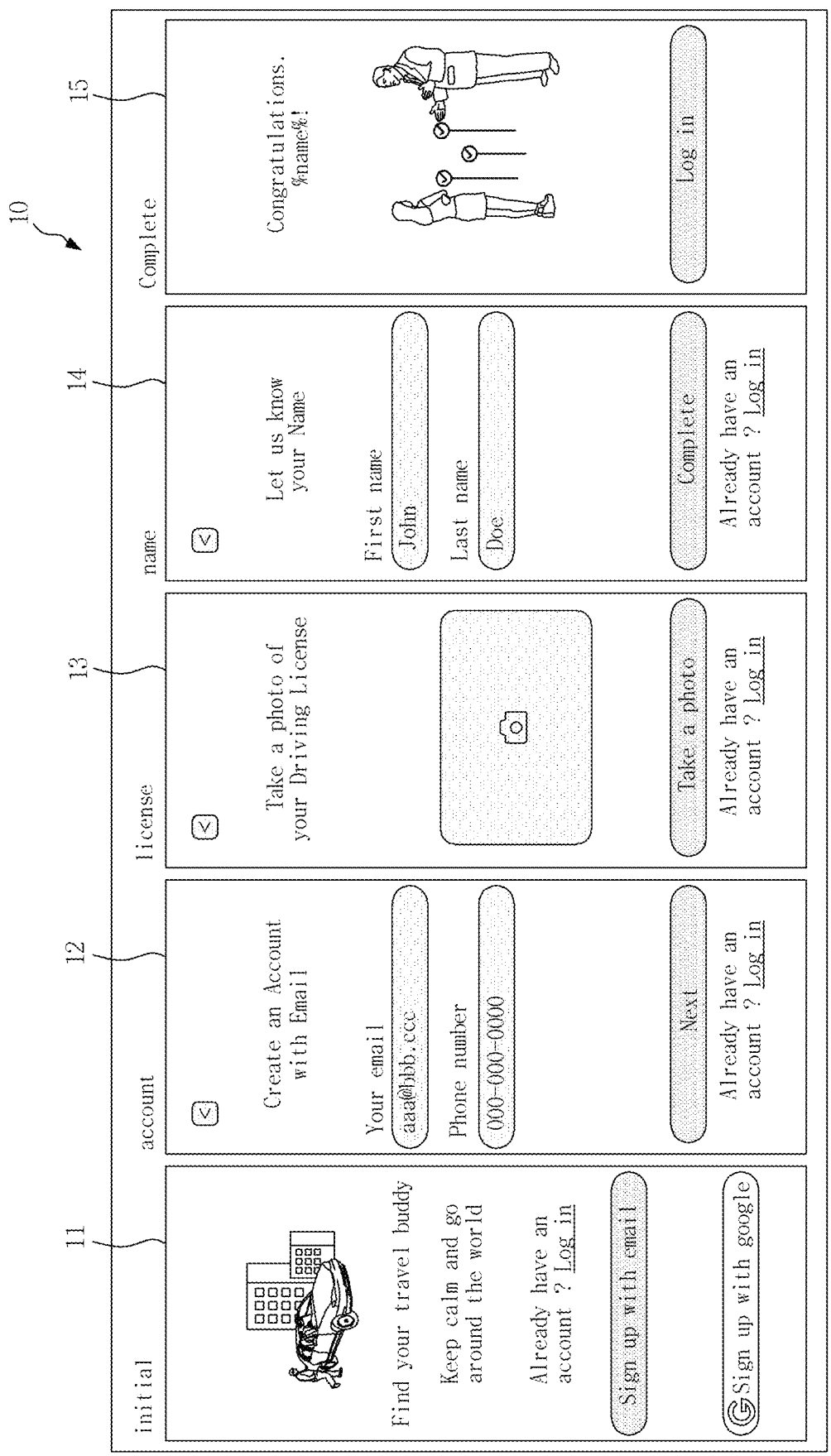
FIG. 1 is an example of situation-specific design screens produced in a UI authoring tool according to the related art.

Hereinafter, preferred embodiments of the present disclosure will be described with reference to the attached drawings. The advantages and features of the present disclosure and methods of accomplishing the same may be understood more readily by reference to the following detailed description of preferred embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

In adding reference numerals to the components of each drawing, it should be noted that the same reference numerals are assigned to the same components as much as possible even though they are shown in different drawings. In addition, in describing the present disclosure, when it is determined that the detailed description of the related well-known configuration or function may obscure the gist of the present disclosure, the detailed description thereof will be omitted.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

In addition, in describing the component of this disclosure, terms, such as first, second, A, B, (a), (b), can be used. These terms are only for distinguishing the components from other components, and the nature or order of the components is not limited by the terms. If a component is described as being "connected," "coupled" or "contacted" to another component, that component may be directly connected to or contacted with that other component, but it should be understood that another component also may be "connected," "coupled" or "contacted" between each component.

The terms "comprise", "include", "have", etc. when used in this specification, specify the presence of stated features, integers, steps, operations, elements, components, and/or combinations of them but do not preclude the presence or addition of one or more other features, integers, steps, operations, elements, components, and/or combinations thereof.

Hereinafter, some embodiments of the present disclosure will be described in detail with reference to the accompanying drawings.

Figure 2:
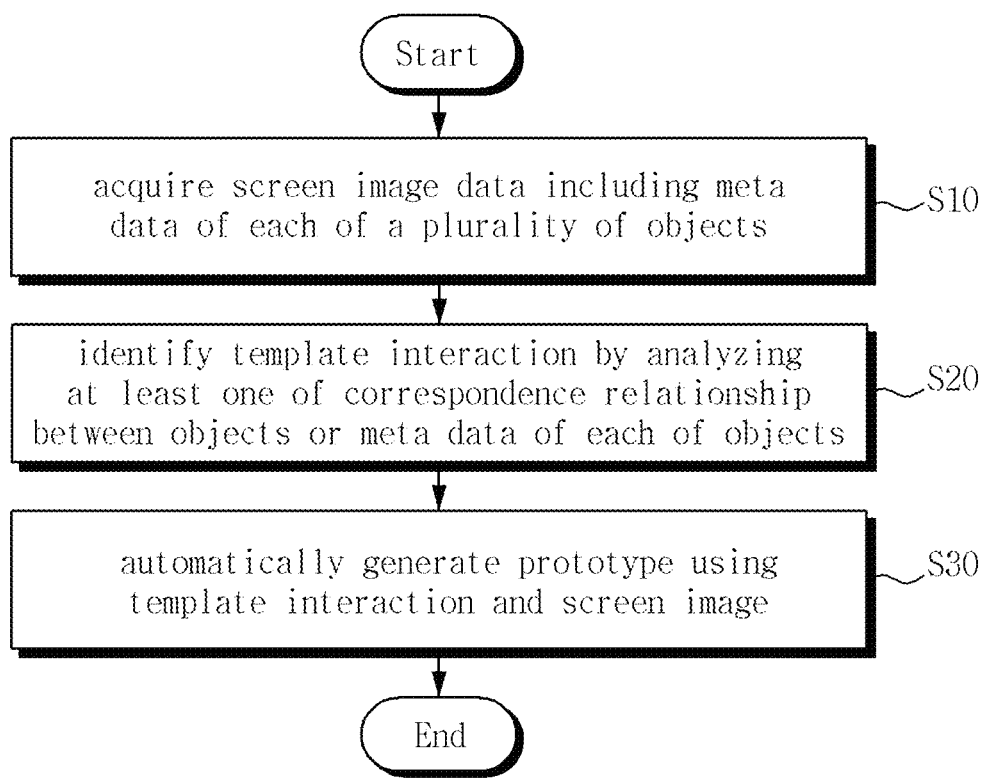
FIG. 2 is a flow chart illustrating a method for generating a prototype using screen images according to one embodiment of the present disclosure.

FIG. 2 is a flow chart illustrating a method for generating a prototype using screen images according to one embodiment of the present disclosure.

Figure 15:
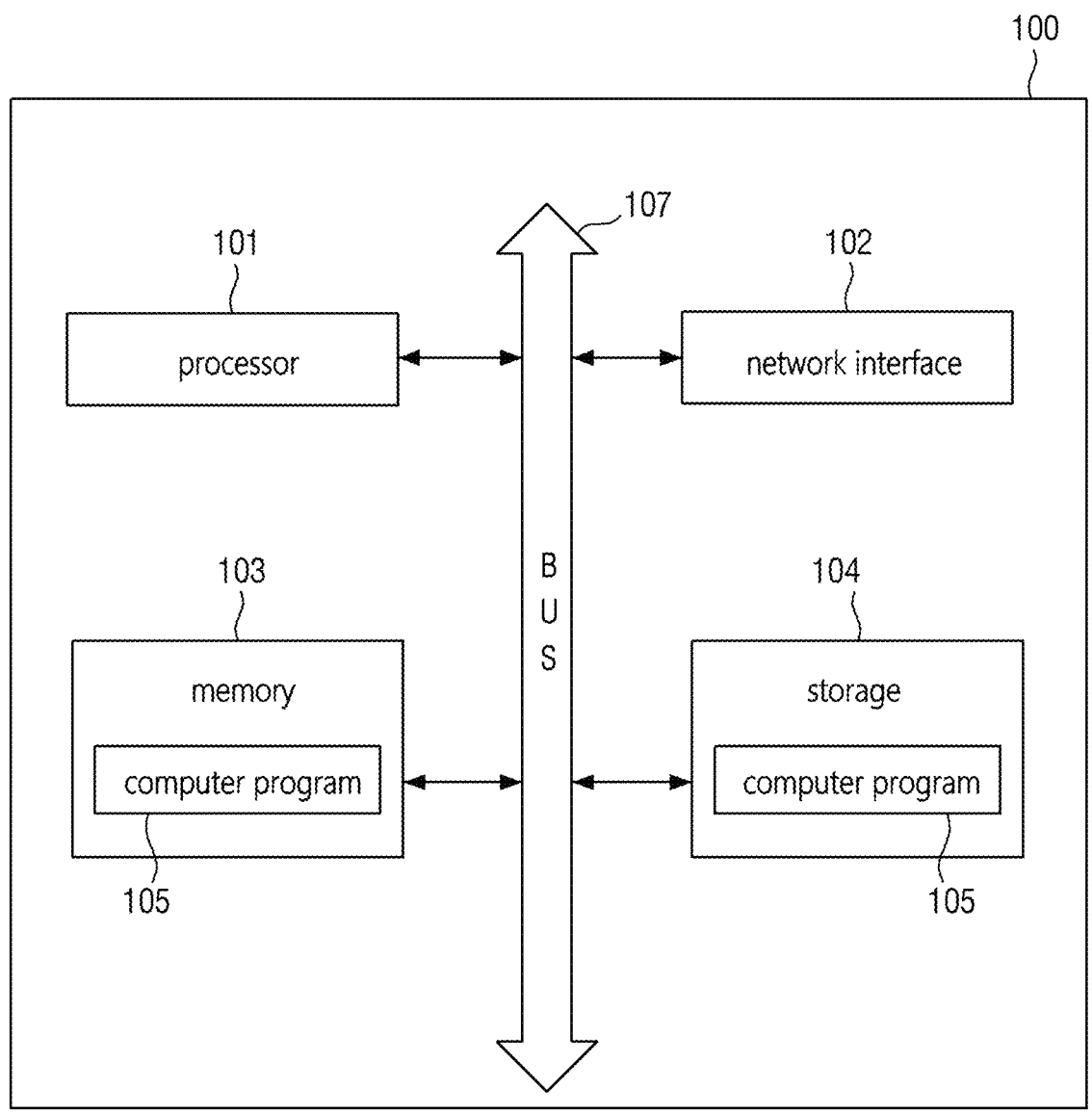
FIG. 15 is a hardware schematic view illustrating an exemplary computing system capable of implementing methods according to one embodiment of the present disclosure.

The method for generating a prototype using screen images according to the embodiment of the present disclosure may be executed by a computing system 100 shown in FIG. 15.

The description of a subject for performing some operations included in the method according to the embodiment of the present disclosure may be omitted, and in this case, it is noted that the subject is the computing system 100.

According to the embodiment of the present disclosure described below, in order to provide a prototype for developing or demonstrating a screen interface such as a mobile application, the prototype may be automatically generated using a screen image including a plurality of objects.

First, in step S10, the computing system 100 acquires screen image data including meta data for each of the plurality of objects included in the screen image.

In this case, the screen image may be a UI image for a mobile application or the like. The objects may be objects included in the screen image, for example, objects such as an input form, a camera view, a check box, a radio button, a toggle button, a dropdown and a selection button, which are triggered by a user input to generate a response. Also, the objects may be texts or images simply displayed on the screen image without requiring the user input.

Meanwhile, the meta data may include information on at least one of a hierarchical structure of the plurality of objects, a type of each object, a display attribute of each object, screen coordinates of each object or an input style of each object.

In this case, the hierarchical structure of the plurality of objects may include information on an object group consisting of an upper object and one or more lower objects. The type of each object may include, for example, an input form type, a camera view type, a check box type, a selection button type and a text type. The display attribute of each object may include, for example, color, size and shape. The screen coordinates of each object may be a position of an object displayed on the screen image. The input style of each object may include a font, a size and a color of a text input onto the object.

As one embodiment, when performing the step S10, the computing system 100 may import a screen image provided from an external device or a screen image produced by a UI design authoring tool through an import function. As another example, the computing system 100 may directly design and generate a screen image on a prototype authoring application.

Next, in step S20, the computing system 100 analyzes at least one of a correspondence relationship between the plurality of objects or meta data of each of the plurality of objects, and identifies a template interaction corresponding to a screen image among a plurality of predefined template interactions based on the analyzed result.

At this time, the correspondence relationship between the plurality of objects may include a screen arrangement order, a screen arrangement position and a semantic order of the objects.

Meanwhile, each of the plurality of predefined template interactions may include a plurality of template objects, and a trigger and a response, which are applied to each template object. In addition, each of the plurality of template interactions may be set by a user input.

Figure 3:
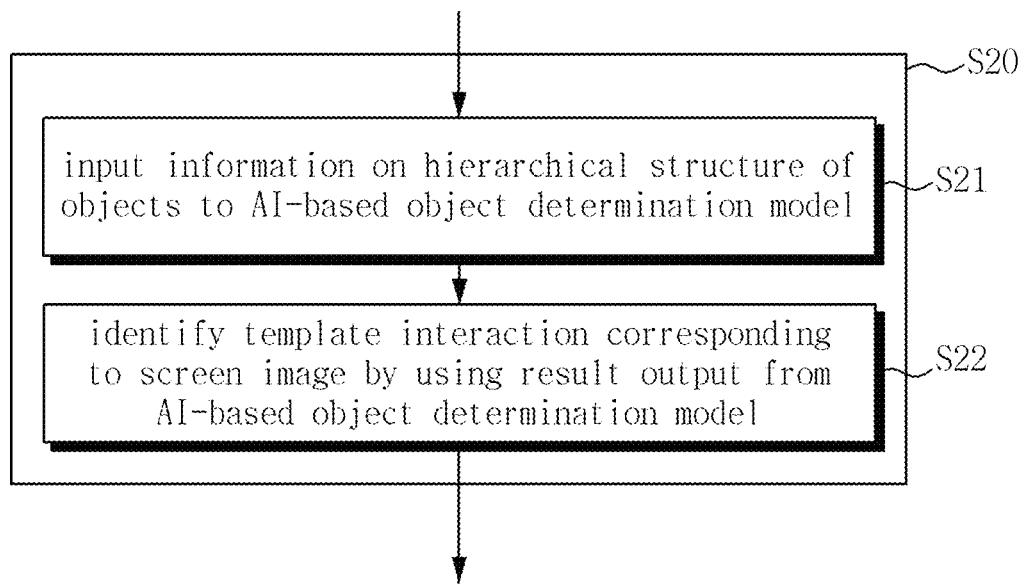
FIGS. 3 to 5 are flow charts illustrating a detailed process of some steps shown in FIG. 2.

Hereinafter, referring to FIG. 3, the step S20 may include steps S21 and S22 as detailed operations.

In step S21, the computing system 100 may input information on the hierarchical structure of the plurality of objects among the meta data of each of the plurality of objects to a machine-learned AI-based object determination model. In this case, the AI-based object determination model may be a model generated by performing machine learning or deep learning using the screen images including the plurality of objects and learning data including a recognition result of each object.

In step S22, the computing system 100 may identify a template interaction corresponding to the screen image among the plurality of predefined template interactions by using the result output from the AI-based object determination model.

Figure 14:
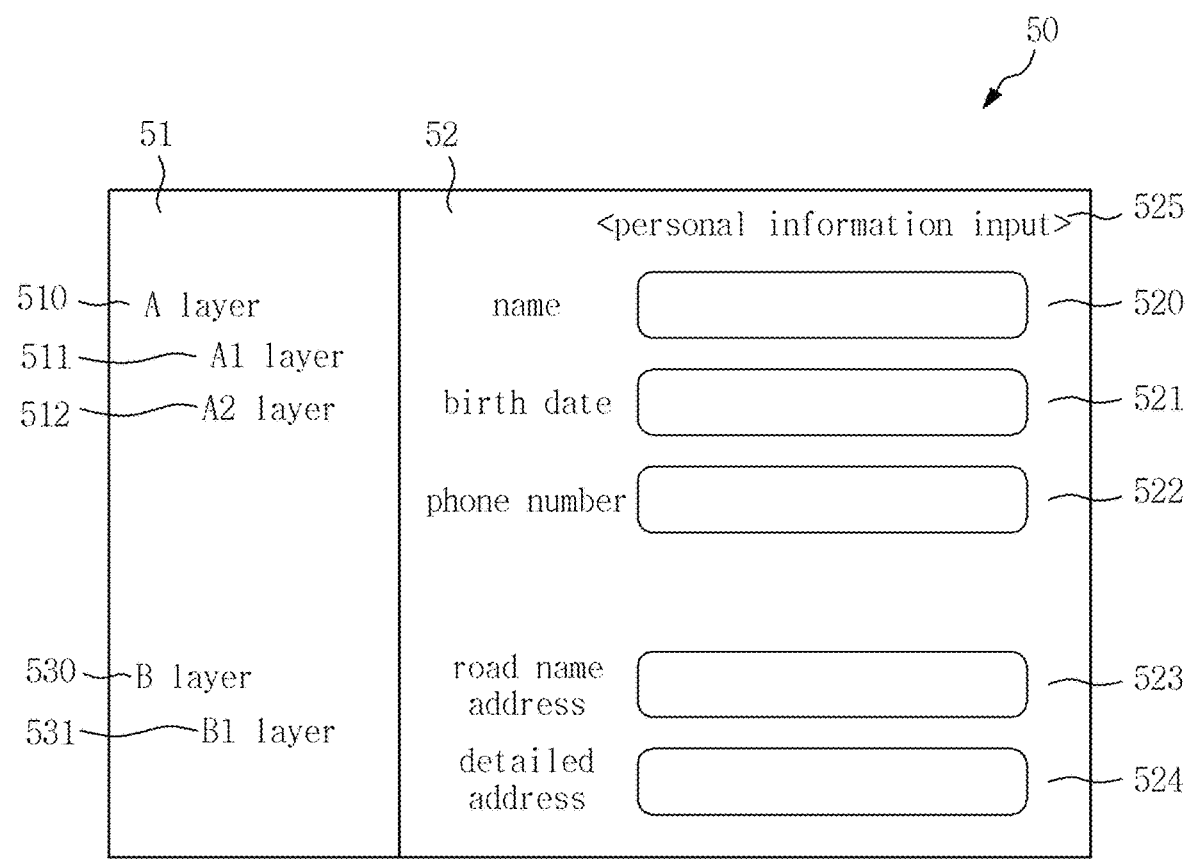
FIG. 14 is an example of identifying a plurality of objects included in a screen image by analyzing a hierarchical structure of a plurality of objects according to some embodiments of the present disclosure.

For example, as shown in FIG. 14, the computing system 100 may display a screen image 52 for inputting personal information imported through the import function on an application screen 50 and a meta data area 51 for providing information on the meta data of each of the plurality of objects included in the screen image 52.

In the shown example, the screen image 52 for inputting personal information includes a plurality of objects 520, 521, 522, 523 and 524, and the meta data area 51 may include meta data defining a hierarchical structure of the plurality of objects 520, 521, 522, 523 and 524.

In detail, the computing system 100 may display meta data, in which A layer 510 is defined as an upper layer and A1 layer 511 and A2 layer 512 are defined as lower layers, on an upper end of the meta data area 51. The computing system 100 may obtain a determination result regarding what type of object each of the objects 520, 521 and 522 displayed on an upper end of the screen image 52 is, by inputting information on a hierarchical structure, which includes the upper layer and the lower layers, to the AI-based object determination model.

As an example, when information on a hierarchical structure consisting of the A layer 510, the A1 layer 511 and the A2 layer 512 is input to the learned object determination model, 'name input box', 'birth date input box' and 'phone number input box' may be respectively output as a result of the determination of each of the objects 520, 521 and 522 displayed on the upper end of the screen image 52.

Likewise, the computing system 100 may display meta data, in which B layer 530 is defined as an upper layer and B1 layer 531 is defined as a lower layer, on a lower end of the meta data area 51, and may obtain a determination result regarding what type of object each of the objects 523 and 524 displayed on a lower end of the screen image 52 is, by inputting information on such a hierarchical structure to the object determination model.

As an example, when information on a hierarchical structure consisting of the B layer 530 and the B1 layer 531 is input to the learned object determination model, 'road name address input box' and 'detailed address input box' may be respectively output as a result of the determination of each of the objects 523 and 524 displayed on the lower end of the screen image 52.

At this time, information input to the object determination model may additionally include text information 'personal information input' displayed on a title object 525 of the screen image 52 in addition to the information on the hierarchical structure.

In this way, in addition to the information on the hierarchical structure of each object, text or image information included in the object may be applied to the AI-based object determination model, so that accuracy on the determination result of the object may be more increased.

As described above, when the information on the hierarchical structure is input to the AI-based object determination model to determine what type of object each of the plurality of objects included in the screen image 52 is, a template interaction corresponding to the screen image 52 among a plurality of template interactions designated in advance by a user may be identified.

That is, in the example of FIG. 14, the computing system 100 may identify the plurality of objects 520, 521, 522, 523 and 524 included in the screen image 52 as objects related to personal information input from the output result of the AI-based object determination model.

In this case, the computing system 100 may determine a template interaction related to a personal information input, having the same hierarchical structure as the plurality of objects 520, 521, 522, 523 and 524 among the plurality of template interactions preset by the user as a template interaction to be used to generate a prototype.

Figure 4:
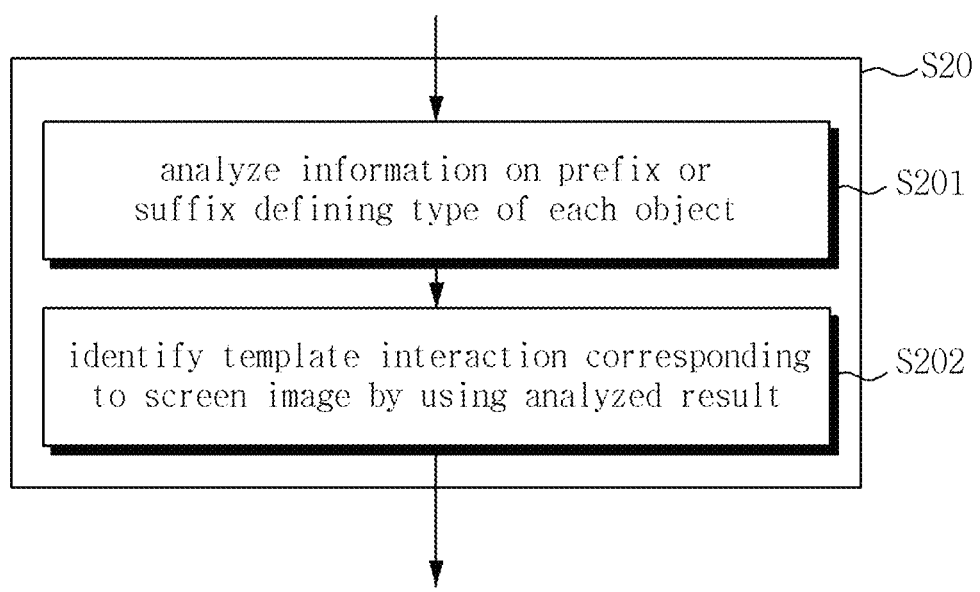

Hereinafter, referring to FIG. 4, the step S20 may include steps S201 and S202 as detailed operations.

In step S201, the computing system 100 may analyze information on a prefix or suffix defining the type of each object among the meta data of each of the plurality of objects.

In step S202, the computing system 100 may identify a template interaction corresponding to the screen image by using the analyzed result.

Figure 8:
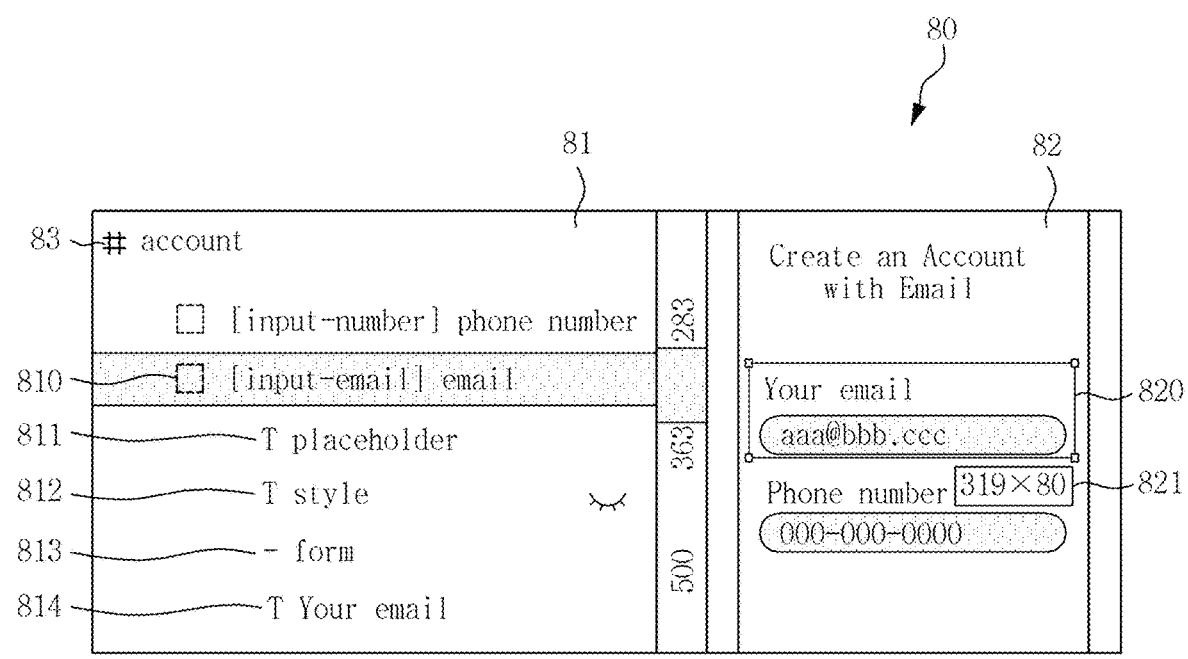
FIG. 8 is an example of displaying meta data and a screen image including an input form object according to some embodiments of the present disclosure.

As an example, in the example shown in FIG. 8, the computing system 100 may display a screen image 82 for generating an email account imported through an import function on an application screen 80 for generating a prototype, and a meta data area 81 for providing information on the meta data of each of the plurality of objects included in the screen image 82.

In the shown example, the screen image 82 for generating an email account includes an email input object 820, and the meta data area 81 may display an account layer 83 corresponding to the screen image 82 and an email input object layer 810 defining meta data for the email input object 820 below the account layer 83.

In detail, the computing system 100 may analyze a prefix [input-email] defined in front of the email input object layer 810 in the meta data area 81. In this case, the computing system 100 may determine that the object 820 included in the screen image 82 is an object for email input, by identifying the prefix [input-email]. Also, the computing system 100 may identify that a layout of a keyboard to be used for the email input object 820 is an email input layout, through 'email' included in [input-email].

As described above, the computing system 100 may analyze a prefix defined at the front of the object layer displayed in the meta data area or a suffix defined at the rear of the object layer so that input objects, such as text, numbers and passwords, in addition to the email input object included on the screen image, may be identified when they are included on the screen image.

Also, referring to FIG. 8, the computing system 100 may identify attributes of the email input object 820 through analysis for sub-layers 811, 812, 813 and 814 displayed below the email input object layer 810.

As an example, text that is shown as default before an input with respect to the email input object 820 occurs may be defined and displayed on a placeholder layer 811 of the sub-layers. Also, a style (font, size, color, etc.) of a text input to the email input object 820 may be defined and displayed on the style layer 812 of the sub-layers. Also, a color, a size, a shape, a location, etc. of the email input object 820 may be defined and displayed on the form layer 813 of the sub-layers. Also, a text to be displayed on a portion of the email input object 820 may be defined on the text layer 814 of the sub-layers.

The computing system 100 may identify the attributes of the email input object 820 through analysis of the sub-layers 811, 812, 813 and 814 of the email input object layer 810 defined as described above.

In addition, the computing system 100 may identify where the email input object 820 should be displayed on the screen image 82, by referring to information on screen coordinates 821 displayed below the email input object 820.

That is, the computing system 100 may identify that the object 820 is an object for e-mail input and at the same time identify attributes of the object 820 by analyzing the prefix displayed on the e-mail input object layer 810 and information on attributes displayed on the sub-layers 811, 812, 813 and 814.

Therefore, the computing system 100 may determine a template interaction including an object identical or similar to the identified email input object 820 as a template interaction to be used to generate a prototype by analyzing prefix/suffix information, attribute information and screen coordinates among a plurality of template interactions preset by the user.

Figure 9:
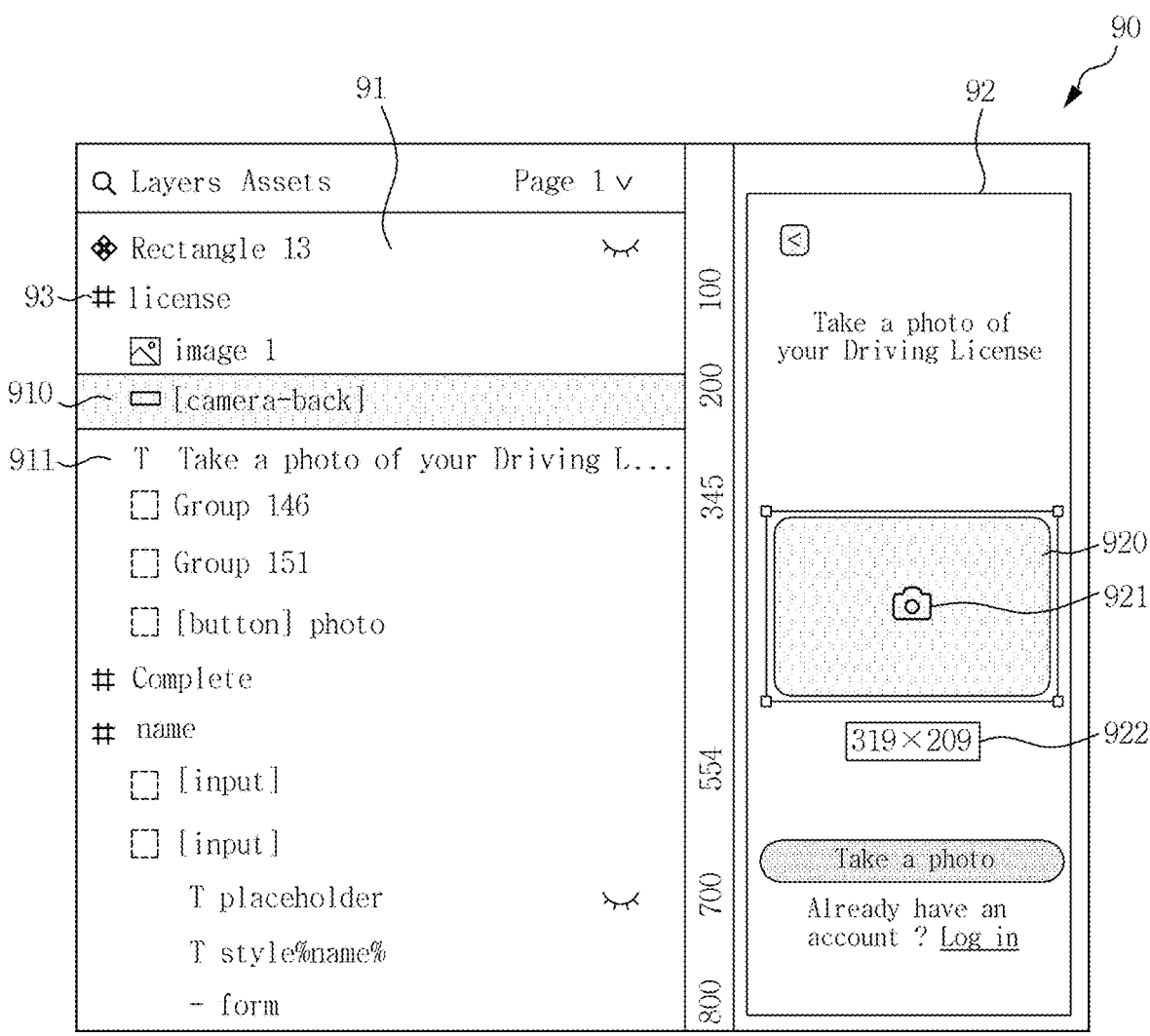
FIG. 9 is an example of displaying meta data and a screen image including a camera view object according to some embodiments of the present disclosure.

As one embodiment, referring to FIG. 9, the computing system 100 may display a screen image 92 for taking a driver's license photo imported through an import function and a meta data area 91 for providing information on the meta data of each of the plurality of objects included in the screen image 92 on an application screen 90 for generating a prototype.

In the shown example, the screen image 92 for taking a driver's license photo may include a camera view object 920, and the meta data area 91 may display a license layer 93 corresponding to the screen image 92 and a camera view object layer 910 defining meta data for the camera view object 920 below the license layer 93.

In detail, the computing system 100 may analyze a prefix [camera-back] defined in the camera view object layer 910 in the meta data area 91. In this case, the computing system 100 may identify the prefix [camera-back] to determine that the object 920 included in the screen image 92 is an object for photographing. Also, the computing system 100 may identify that the camera view object 920 is a layout for photographing using a rear camera, through 'back' included in the [camera-back].

In addition, the computing system 100 may identify a position on the screen image 92, where the camera view object 920 should be displayed, by referring to information on screen coordinates 922 displayed below the camera view object 920.

Therefore, the computing system 100 may determine a template interaction including an object identical or similar to the camera view object 920 among a plurality of template interactions preset by the user as a template interaction to be used to generate a prototype.

Figure 10:
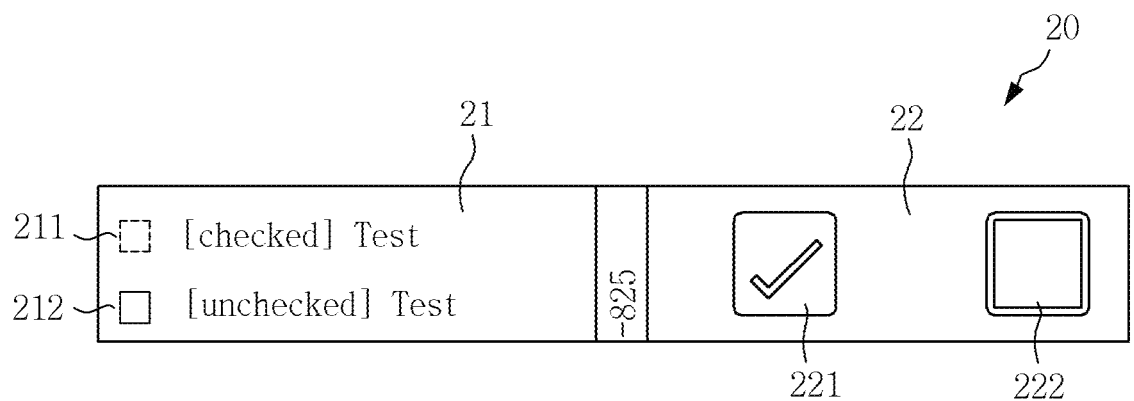
FIG. 10 is an example of displaying meta data and a screen image including a check box object according to some embodiments of the present disclosure.

As one embodiment, referring to FIG. 10, the computing system 100 may display a screen image 22 for selecting a check box imported through an import function and a meta data area 21 for providing information on the meta data of each of the plurality of objects included in the screen image 22, on an application screen 20 for generating a prototype.

In the shown example, the screen image 22 for selecting a check box includes a check box selected object 221 and a check box unselected object 222, and the meta data area 21 may display a check box selected object layer 211 and a check box unselected object layer 212, which define meta data for each of the check box selected object 221 and the check box unselected object 222.

In detail, the computing system 100 may identify a prefix [checked] defined in the check box selected object layer 211 in the meta data area 21 to identify that the object 221 included in the screen image 22 is a selected check box object. In addition, the computing system 100 may identify [unchecked] defined in the check box unselected object layer 212 to identify that the object 222 included in the screen image 22 is an unselected check box object.

Therefore, the computing system 100 may determine a template interaction including objects identical or similar to the check box selected object 221 and the check box unselected object 222 among the plurality of template interactions preset by the user as a template interaction to be used to generate a prototype.

According to one embodiment of the present disclosure as described above, a screen image and a prototype corresponding to the screen image may be automatically generated on single software by using the meta data of each of the plurality of objects included in the screen image.

Figure 5:
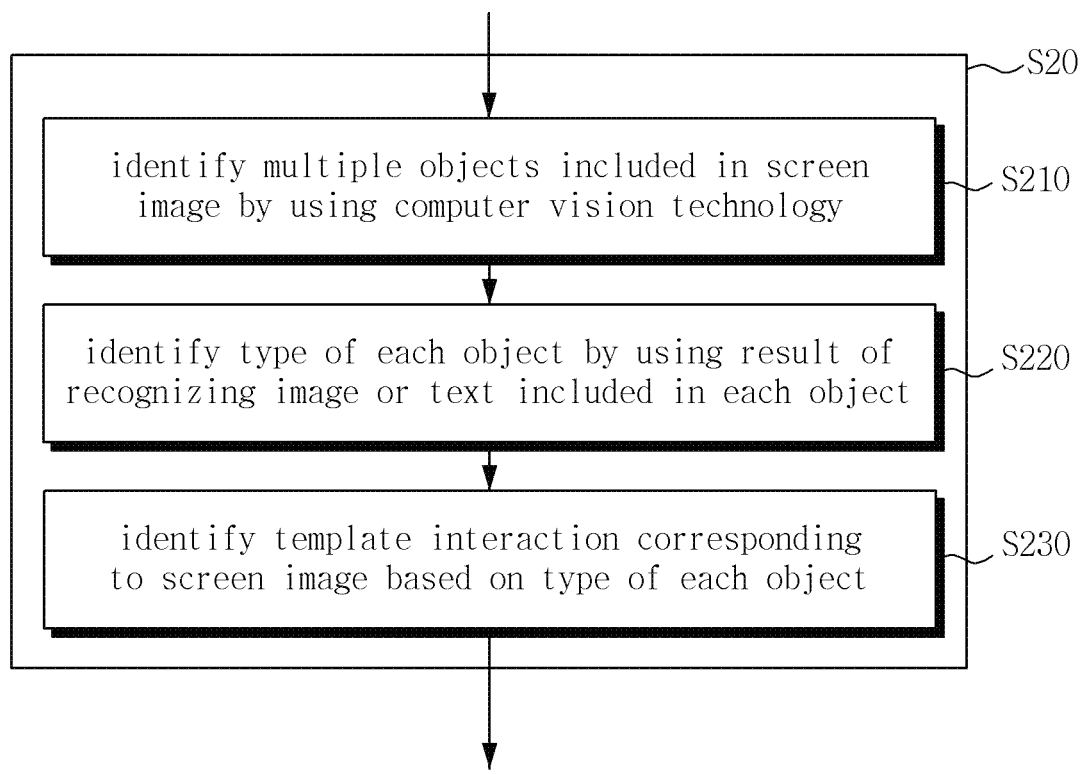

Hereinafter, referring to FIG. 5, the step S20 may include steps S210, S220 and S230 as detailed operations.

In the step S210, the computing system 100 may identify a plurality of objects included in the screen image by using the computer vision technology.

In the step S220, the computing system 100 may identify a type of each object by using the result of recognizing the image or text included in each object, and in the step S230, the computing system 100 may identify the template interaction corresponding to the screen image based on the identified type of each object.

As an example, in the example of FIG. 9, when meta data such as prefix information on the camera view object 920 is not defined in the meta data area 91, the computing system 100 may identify that the object 920 included in the screen image 92 is an object for camera photographing, through analysis using a camera image 921 displayed on the camera view object 920, text information displayed to be close to the camera view object 920, and a size, position, etc. of the camera view object 920, based on an AI learning model using a computer vision algorithm.

In addition, in the example of FIG. 10, when prefix information on each of the objects 221 and 222 is not defined in the meta data area 21, the computing system 100 may recognize each of the objects 221 and 222 by using the computer vision technology, identify an object with high similarity to each of the objects 221 and 222 among learning data, which are previously collected and stored, and determine a template interaction including the identified object as a template interaction to be used to generate a prototype.

As one embodiment, the computing system 100 may identify a template interaction corresponding to the screen image by using at least one of the meta data for each of the plurality of objects or the information on the type of each object identified based on the AI learning model.

As an example, when the meta data exists for only some of the plurality of objects included in the screen image, the computing system 100 may identify a type of some objects by using the meta data, and may identify a type of the other objects by using the computer vision technology.

Referring back to FIG. 2, finally, in step S30, the computing system 100 automatically generates a prototype corresponding to the screen image by using the template interaction identified through the step S20 and the screen image.

In this case, after performing the steps S10 to S30, the computing system 100 may additionally perform an operation of displaying a scan image, which includes an identification code for transmitting the automatically generated prototype to an external device, on the screen.

Therefore, the prototype automatically generated using the screen image may be provided to the external device for the purpose of developing or demonstrating a screen interface such as a mobile application.

Figure 6:
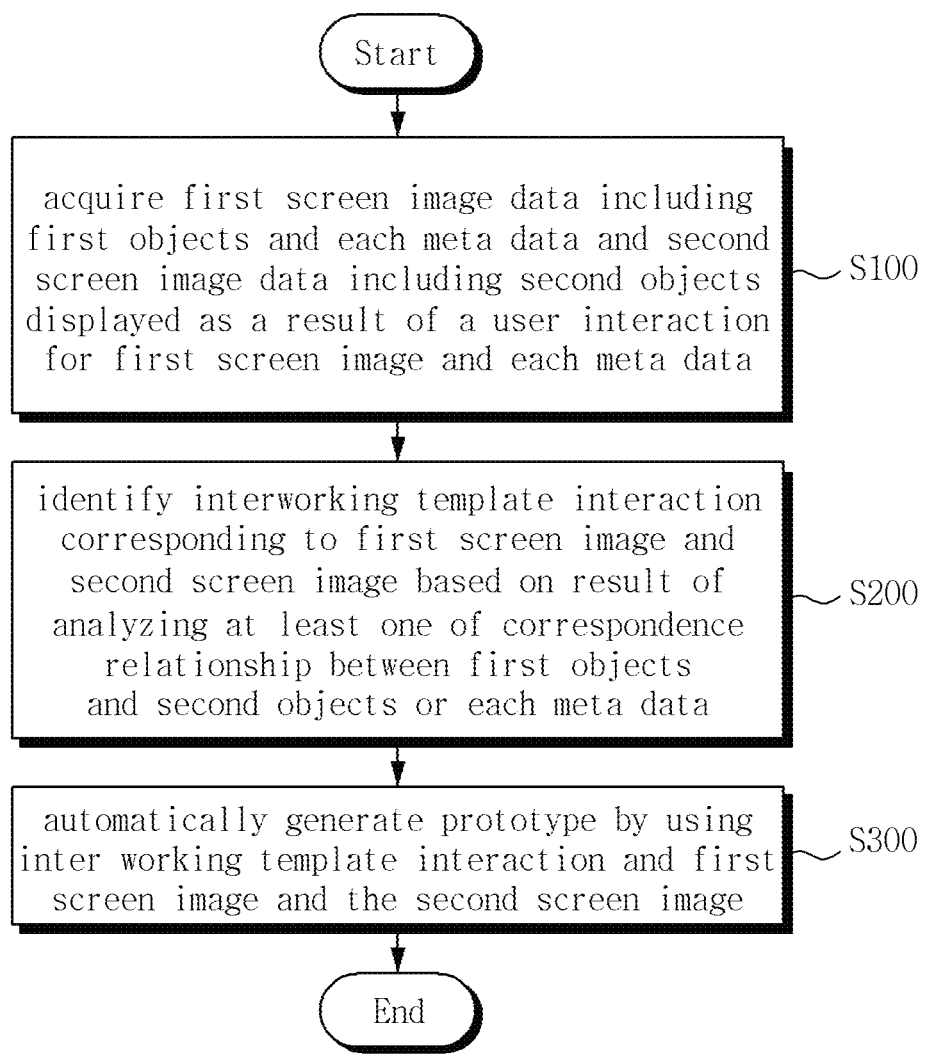
FIG. 6 is a flow chart illustrating a method for generating a prototype using screen images according to another embodiment of the present disclosure.

FIG. 6 is a flow chart illustrating a method for generating a prototype using screen images according to another embodiment of the present disclosure.

The method for generating a prototype using a screen image according to one embodiment of the present disclosure may be executed by the computing system 100 shown in FIG. 15.

The description of a subject for performing some operations included in the method according to the embodiment of the present disclosure may be omitted, and in this case, it is noted that the subject is the computing system 100.

According to the embodiment of the present disclosure described below, a prototype using the plurality of screen images may be automatically generated through analysis of an interworking relationship between the screen images by using the meta data for each object of the plurality of screen images including the plurality of objects.

First, in the step S100, the computing system 100 acquires first screen image data including a plurality of first objects included in a first screen image and meta data of each of the first objects and second screen image data including a plurality of second objects included in a second screen image displayed as a result of a user interaction for the first screen image and meta data of each of the second objects.

In this case, the computing system 100 may acquire the meta data including information on a before-and-after relationship between the first screen image and the second screen image. Therefore, when a prototype corresponding to the first screen image and the second screen image is generated, the first screen image is displayed using the information on the before-and-after relationship in a first order, and when a user interaction for the first screen image occurs, interaction in which the second screen image is displayed in a second order may be applied.

Next, in step S200, the computing system 100 identifies an interworking template interaction corresponding to the first screen image and the second screen image based on a result of analyzing at least one of a correspondence relationship between the plurality of first objects and the plurality of second objects or the meta data of each of the plurality of first objects and the plurality of second objects.

Figure 7:
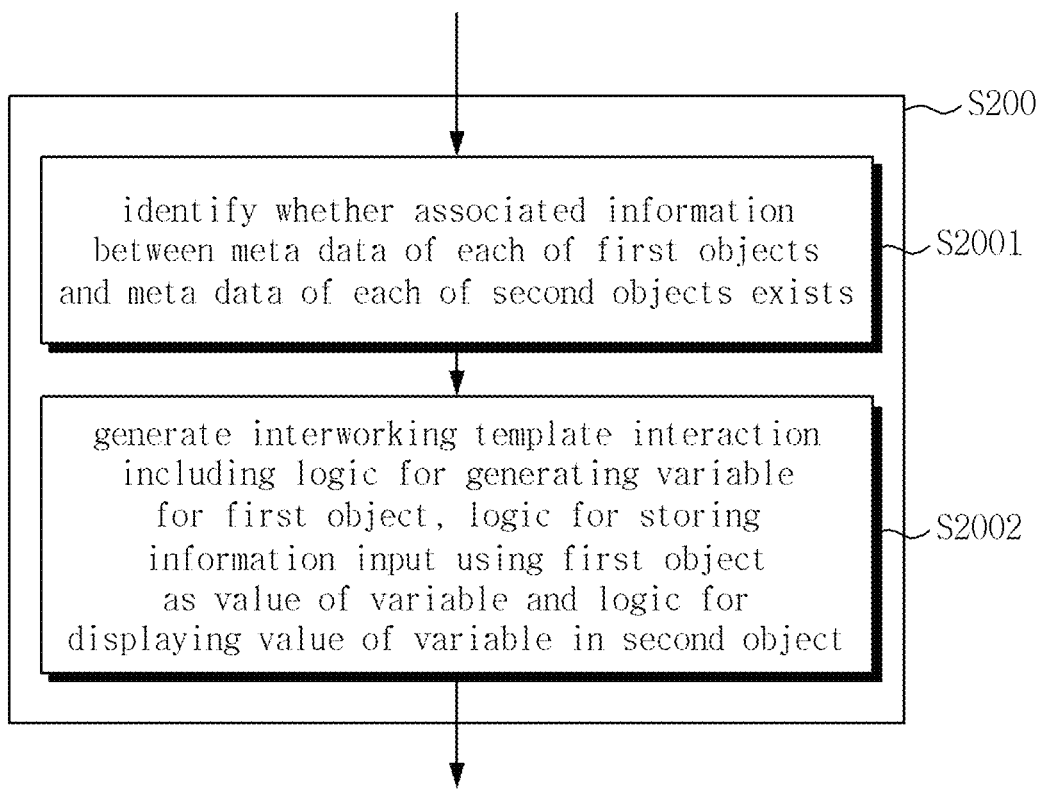
FIG. 7 is a flow chart illustrating a detailed process of some steps shown in FIG. 6.

As one embodiment, referring to FIG. 7, the step S200 may include steps S2001 and S2002 as detailed operations.

In the step S2001, the computing system 100 may identify whether associated information between the meta data of each of the plurality of first objects and the meta data of each of the plurality of second objects exists.

In the step S2002, when it is identified that the information exists through the step S2001, the computing system 100 may generate an interworking template interaction that includes a logic for generating a variable for a first object that is one of the plurality of first objects, a logic for storing information input using the first object as a value of the variable and a logic for displaying the stored value of the variable in a second object that is one of the plurality of second objects.

Figure 11:
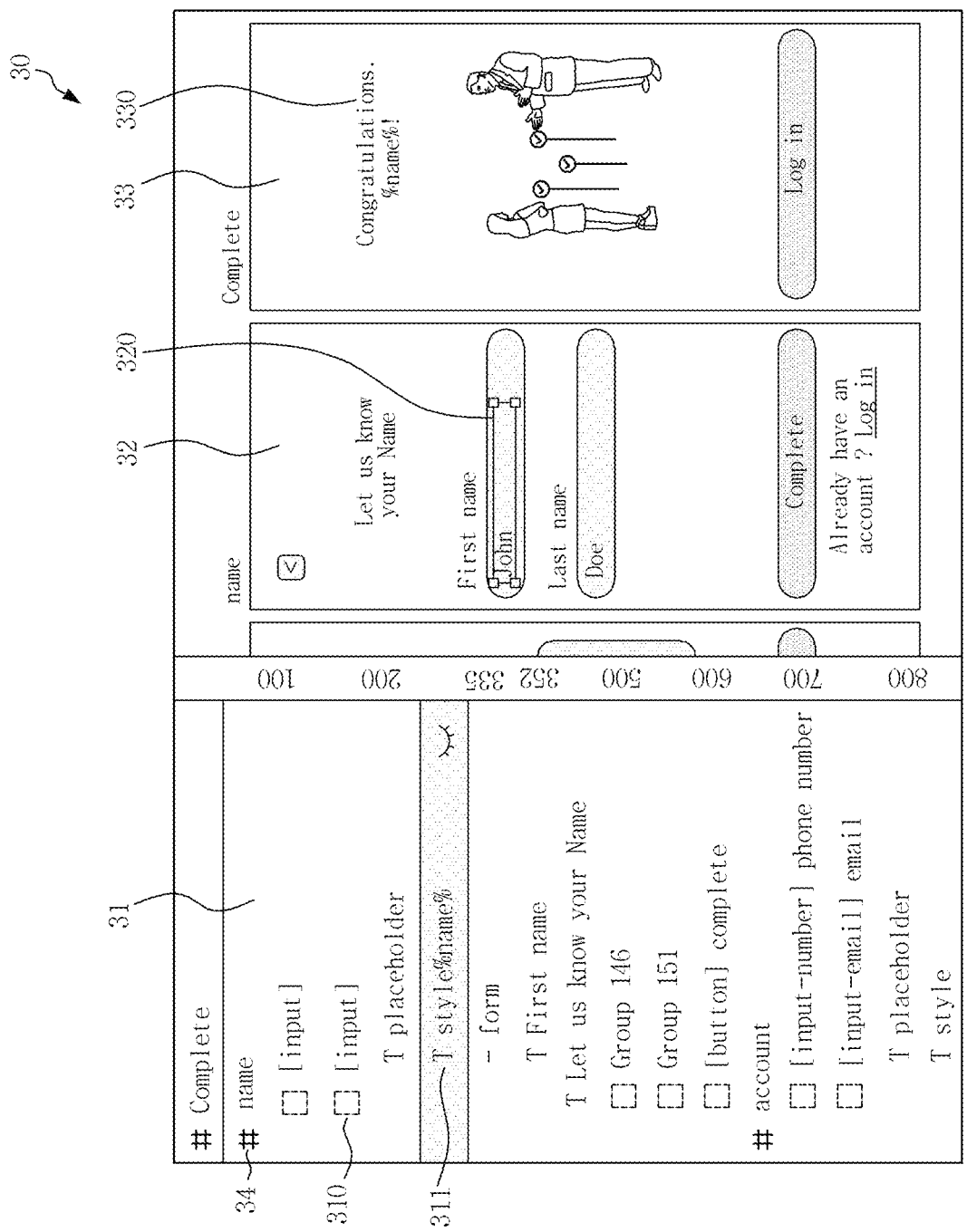
FIG. 11 is an example of displaying meta data for interworking a first screen image with a second screen image according to some embodiments of the present disclosure.

As an example, in the example shown in FIG. 11, the computing system 100 may display a first screen image 32 for name registration imported through an import function, a second screen image 33 for checking a state that name registration is completed, and a meta data area 31 for providing information on meta data of each of a plurality of objects included in each of the screen images 32 and 33, on a application screen 30 for generating a prototype.

In the shown example, the first screen image 32 may include an input object 320, and the second screen image 33 may include a text object 330. In this case, the meta data area 31 may display a name layer 34 corresponding to the first screen image 32 and an input object layer 310 defining meta data for the input object 320 below the name layer 34. Also, a complete layer corresponding to the second screen image 33 may be displayed on an upper end of the name layer 34.

In detail, the computing system 100 may identify a prefix [input] displayed on the input object layer 310 in the meta data area 31 to determine that the object 320 included in the first screen image 32 is an object for input. In addition, the computing system 100 may determine that the object 330 is an object for text output by recognizing the object 330 included in the second screen image 33 by using the computer vision technology.

In this case, the computing system 100 may identify an interworking relationship that a value input to the input object 320 of the first screen image 32 is displayed on the text object 330 of the second screen image 33 by referring to a first parameter 'style % name %' displayed on a variable generation layer 311 positioned below the input object layer 310 and a second parameter '% name %' displayed on the text object 330 of the second screen image 33, and may generate an interworking template interaction to which a logic of the interworking relationship is applied.

As an example, the computing system 100 may generate a variable 'name' by referring to the first parameter 'style % name %' displayed on the variable generation layer 311, and when a text value 'John' is input through the input object 320 of the first screen image 32, 'John' may be stored in the variable 'name'. In this case, when a 'complete' button positioned on a lower end of the first screen image 32 is clicked, 'John', which is a value stored in the variable 'name', may be automatically displayed in a portion '% name' of 'Congratulations, % name %!' displayed on the text object 330 of the second screen image 33.

Finally, in step S300, the computing system 100 automatically generates a prototype corresponding to the first screen image and the second screen image by using the interworking template interaction generated in the step S200 and the first screen image and the second screen image.

Figure 12:
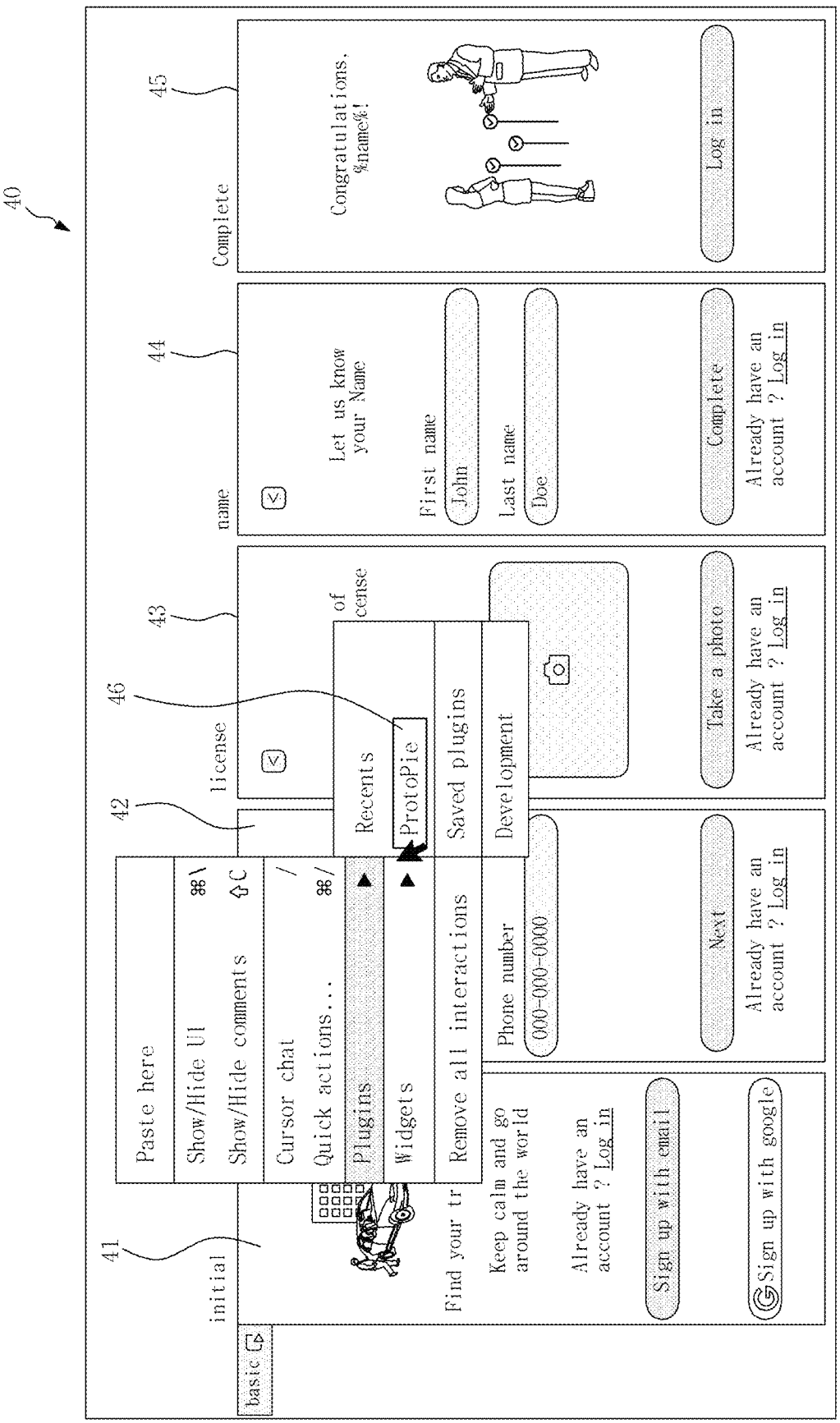
FIGS. 12 and 13 are examples of providing an execution screen and a pop-up menu for generating a prototype according to some embodiments of the present disclosure.
Figure 13:
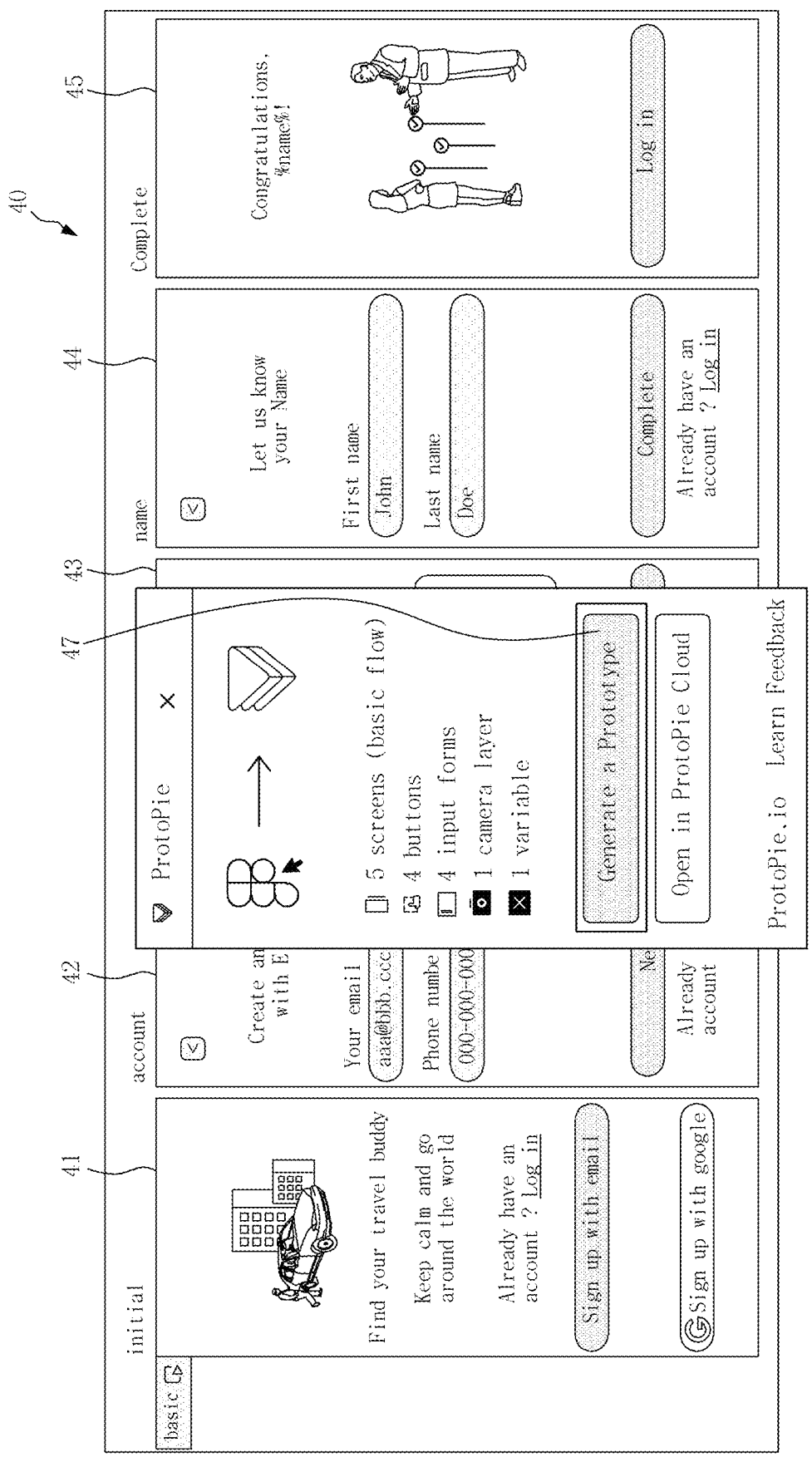

FIGS. 12 and 13 are examples of providing an execution screen and a pop-up menu for generating a prototype according to some embodiments of the present disclosure.

First, in the example shown in FIG. 12, the computing system 100 may execute a prototype generation function through an input for selecting a plug-in menu item 46 displayed as a pop-up menu in a state that screen images 41, 42, 43, 44 and 45 designed and produced on a UI authoring application screen 40 are displayed. In this case, the prototype generation function through the plug-in may be implemented based on an API or SDK.

As shown in FIG. 13, when an input for the plug-in menu item 46 displayed on the UI authoring application screen 40 is received in FIG. 12, the computing system 100 may analyze meta data of objects included in the screen images 41, 42, 43, 44 and 45 and display information on the identified objects on a pop-up screen in accordance with the analyzed result.

In this case, when a confirmation button 47 such as 'Generate a Prototype' displayed on the pop-up screen is selected, the computing system 100 may identify the template interaction by using information on objects identified through meta data analysis and automatically generate a prototype by using the screen images 41, 42, 43, 44 and 45 and the template interaction.

Meanwhile, in the examples of FIGS. 12 and 13, the computing system 100 executes the prototype generation function through the plug-in menu in a state that the screen images produced on the UI authoring application 40 are displayed, but is not limited by the present embodiment.

As another embodiment, the computing system 100 may execute a prototype generation function by importing a plurality of screen images previously designed and produced by the UI authoring application on a prototype generation application. In this case, when generating the prototype, the computing system 100 may use a sensor of a mobile device or apply an interaction that should control communication between devices.

According to the embodiment of the present disclosure as described above, a prototype including a user interaction may be automatically generated using a screen image on single software without the need to use the UI design authoring tool and the prototype authoring tool individually. Therefore, the effort, time and cost, which are required for generating a prototype, may be reduced more remarkably than the case that the UI screen design and the prototype are produced separately.

FIG. 15 is a hardware configuration diagram of an exemplary computing system 100.

Referring to FIG. 15, the computing system 100 may include one or more processors 101, a bus 107, a network interface 102, a memory 103, which loads a computer program 105 executed by the processors 101, and a storage 104 for storing the computer program 105.

The processor 101 controls overall operations of each component of computing device 100. The processor 101 may be configured to include at least one of a Central Processing Unit (CPU), a Micro Processor Unit (MPU), a Micro Controller Unit (MCU), a Graphics Processing Unit (GPU), or any type of processor well known in the art. Further, the processor 101 may perform calculations on at least one application or program for executing a method/operation according to various embodiments of the present disclosure. The computing system 100 may have one or more processors.

The memory 103 stores various data, instructions and/or information. The memory 103 may load one or more programs 105 from the storage 104 to execute methods/operations according to various embodiments of the present disclosure. An example of the memory 103 may be a RAM, but is not limited thereto.

The bus 107 provides communication between components of computing system 100. The bus 107 may be implemented as various types of bus such as an address bus, a data bus and a control bus.

The network interface 102 supports wired and wireless internet communication of the computing system 100. The network interface 102 may support various communication methods other than internet communication. To this end, the network interface 102 may be configured to comprise a communication module well known in the art of the present disclosure.

The storage 104 can non-temporarily store one or more computer programs 105. The storage 104 may be configured to comprise a non-volatile memory, such as a Read Only Memory (ROM), an Erasable Programmable ROM (EPROM), an Electrically Erasable Programmable ROM (EEPROM), a flash memory, a hard disk, a removable disk, or any type of computer readable recording medium well known in the art.

As one embodiment, the computer program 105 may include instructions for performing an operation of acquiring screen image data including meta data for each of a plurality of objects included in a screen image, an operation of identifying a template interaction corresponding to the screen image among a plurality of predefined template interactions based on a result of analyzing at least one of a correspondence relationship between the plurality of objects or the meta data of each of the plurality of objects, and an operation of automatically generating a prototype corresponding to the screen image by using the identified template interaction and the screen image.

As another embodiment, the computer program 105 may include instructions for performing an operation of acquiring first screen image data including a plurality of first objects included in a first screen image and meta data of each of the first objects and second screen image data including a plurality of second objects included in a second screen image displayed as a result of a user interaction for the first screen image and meta data of each of the second objects, an operation of identifying an interworking template interaction corresponding to the first screen image and the second screen image based on a result of analyzing at least one of a correspondence relationship between the plurality of first objects and the plurality of second objects or meta data of each of the plurality of first objects and the plurality of second objects, and an operation of automatically generating a prototype corresponding to the first screen image and the second screen image by using the identified interworking template interaction and the first screen image and the second screen image.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

Although operations are shown in a specific order in the drawings, it should not be understood that desired results can be obtained when the operations must be performed in the specific order or sequential order or when all of the operations must be performed. In certain situations, multitasking and parallel processing may be advantageous. According to the above-described embodiments, it should not be understood that the separation of various configurations is necessarily required, and it should be understood that the described program components and systems may generally be integrated together into a single software product or be packaged into multiple software products.

In concluding the detailed description, those skilled in the art will appreciate that many variations and modifications can be made to the preferred embodiments without substantially departing from the principles of the present disclosure. Therefore, the disclosed preferred embodiments of the disclosure are used in a generic and descriptive sense only and not for purposes of limitation.

What is claimed is:

1. A method for generating a prototype by using a screen image, performed by a computing system, the method comprising:
    acquiring screen image data including meta data for each of a plurality of objects included in the screen image;
    selecting a first template interaction corresponding to the screen image among a plurality of predefined template interactions based on a result of analyzing the meta data, wherein each of the plurality of predefined template interactions includes a plurality of template objects, and a trigger and a response applied to each of the plurality of template objects; and
    automatically generating a prototype corresponding to the screen image by using the selected first template interaction and the screen image,
    wherein the meta data includes information on hierarchical structure of each of the plurality of objects,
    wherein selecting a first template interaction corresponding to the screen image comprises:
    inputting, to an AI-based object determination model, information on the hierarchical structure included in the meta data and the screen image; and
    selecting the first template interaction corresponding to the screen image among the plurality of predefined template interactions based on determination result on the each object included in the screen image output from the AI-based object determination model, and
    wherein the information on hierarchical structure of each of the plurality of objects includes information input by a user of the computing system.

2. The method of claim 1, wherein the acquiring screen image data includes acquiring the meta data including information on at least one of the hierarchical structure of the plurality of objects, a type of each object, a display attribute, a screen coordinate or an input style.

3. The method of claim 1, wherein the selecting a first template interaction corresponding to the screen image among the plurality of predefined template interactions includes:
    analyzing information on a prefix or suffix defining a type of each object among the meta data of each of the plurality of objects; and
    selecting the first template interaction corresponding to the screen image by using the analyzed result.

4. The method of claim 1, wherein the selecting a first template interaction corresponding to the screen image among the plurality of predefined template interactions includes:
    identifying the plurality of objects included in the screen image and a type of each object based on an AI learning model; and
    selecting the first template interaction corresponding to the screen image based on the identified type of each object.

5. The method of claim 4, wherein the identifying a plurality of objects included in the screen image and a type of each object based on an AI learning model includes:
    identifying the plurality of objects included in the screen image by using the computer vision technology; and
    identifying the type of each object by using a result of recognizing an image or text included in each object.

6. The method of claim 1, wherein the selecting a first template interaction corresponding to the screen image among the plurality of predefined template interactions includes selecting the first template interaction corresponding to the screen image by using at least one of the meta data for each of the plurality of objects or information on the type of each object, which is identified based on an AI learning model.

7. The method of claim 1, wherein each of the plurality of predefined template interactions is set by a user input.

8. The method of claim 1, further comprising displaying a scan image including an identification code for transmitting the automatically generated prototype to an external device on a screen of the computing system.

9. A method for generating a prototype by using a screen image, performed by a computing system, the method comprising:
    acquiring first screen image data including a plurality of first objects included in a first screen image and meta data of each of the first objects and second screen image data including a plurality of second objects included in a second screen image displayed as a result of a user interaction for the first screen image and meta data of each of the second objects;
    selecting a first interworking template interaction corresponding to the first screen image and the second screen image among a plurality of predefined interworking template interactions based on a result of analyzing meta data, wherein each of the plurality of predefined interworking template interactions includes a plurality of first template objects, a plurality of second template objects, and a trigger and a response representing interworking relationship between each of the plurality of first template objects and each of the plurality of second template objects; and
    automatically generating a prototype corresponding to the first screen image and the second screen image by using the selected first interworking template interaction and the first screen image and the second screen image, wherein the meta data includes information on hierarchical structure of each of the plurality of first objects and each of the plurality of second objects, wherein selecting a first interworking template interaction corresponding to the first screen image and the second screen image comprises:

inputting, to an AI-based object determination model, information on the hierarchical structure included in the meta data the first screen image and the second screen image; and selecting a first interworking template interaction corresponding to the first screen image and the second screen image among a plurality of predefined interworking template interactions based on determination result on the each first object and the each second object included in the screen image output from the AI-based object determination model, and wherein the information on hierarchical structure of each of the plurality of objects includes information input by a user of the computing system.

10. The method of claim 9, wherein the acquiring first screen image data and second screen image data includes acquiring the meta data including information on a before-and-after relationship between the first screen image and the second screen image.

11. The method of claim 9, wherein the selecting an interworking template interaction corresponding to the first screen image and the second screen image includes identifying whether associated information between the meta data of the plurality of first objects and the meta data of the plurality of second objects exists.

12. The method of claim 11, wherein, when the associated information exists, the selecting a first interworking template interaction corresponding to the first screen image and the second screen image includes selecting the first interworking template interaction including a logic for generating a variable for a first object that is one of the plurality of first objects, a logic for storing information input using the first object as a value of the variable and a logic for displaying the stored value of the variable in a second object that is one of the plurality of second objects.

13. A computing system comprising:
one or more processors;
a memory loading a computer program performed by the processor; and
a storage storing the computer program,
wherein the computer program includes instructions for performing
an operation of acquiring screen image data including meta data for each of a plurality of objects included in a screen image,
an operation of selecting a first template interaction corresponding to the screen image among a plurality of predefined template interactions based on a result of analyzing the meta data, wherein each of the plurality of predefined template interactions includes a plurality of template objects, and a trigger and a response applied to each of the plurality of template objects, and
an operation of automatically generating a prototype corresponding to the screen image by using the selected first template interaction and the screen image, wherein the metadata includes information on hierarchical structure of each of the plurality of objects, wherein the operation of selecting a first template interaction corresponding to the screen image comprises:

an operation of inputting, to an AI-based object determination model, information on the hierarchical structure included in the meta data and the screen image; and an operation of selecting the first template interaction corresponding to the screen image among the plurality of predefined template interactions based on determination result on the each object included in the screen image output from the AI-based object determination model, and wherein the information on hierarchical structure of each of the plurality of objects includes information input by a user of the computing system.

14. The computing system of claim 13, wherein the operation of acquiring screen image data includes acquiring the meta data including information on at least one of the hierarchical structure of the plurality of objects, a type of each object, a display attribute, a screen coordinate or an input style.

15. The computing system of claim 13, wherein the operation of selecting a first template interaction corresponding to the screen image among a plurality of predefined template interactions includes:

an operation of analyzing information on a prefix or suffix defining a type of each object among the meta data of each of the plurality of objects; and an operation of selecting the first template interaction corresponding to the screen image by using the analyzed result.

16. The computing system of claim 13, wherein the operation of selecting a first template interaction corresponding to the screen image among the plurality of predefined template interactions includes:

an operation of identifying the plurality of objects included in the screen image and a type of each object based on an AI learning model; and an operation of selecting the first template interaction corresponding to the screen image based on the identified type of each object.

17. The computing system of claim 16, wherein the operation of identifying a plurality of objects included in the screen image and a type of each object based on an AI learning model includes:

an operation of identifying the plurality of objects included in the screen image by using the computer vision technology; and an operation of identifying the type of each object by using a result of recognizing an image or text included in each object.

18. The computing system of claim 13, wherein the operation of selecting a first template interaction corresponding to the screen image among the plurality of predefined template interactions includes an operation of selecting the first template interaction corresponding to the screen image by using at least one of the meta data for each of the plurality of objects or information on a type of each object, which is identified based on an AI learning model.

* * * * *